United States Patent
Tolman et al.

[11] 3,868,361
[45] Feb. 25, 1975

[54] S-TRIAZOLO[2,3-A] PRYIMIDINE NUCLEOSIDES

[76] Inventors: Richard L. Tolman, 18253 Bayberry Way, Irvine, Calif. 92664;
Ganapathi R. Revankar, 20312 Santa Ana Ave., No. 8, Santa Ana, Calif. 92707

[22] Filed: Mar. 12, 1973

[21] Appl. No.: 340,224

[52] U.S. Cl......... 260/211.5 R, 260/256.4, 424/180
[51] Int. Cl............................................. C07d 51/50
[58] Field of Search ............................. 260/211.5 R

[56] References Cited
UNITED STATES PATENTS
3,705,147  12/1972  Robins.......................... 260/211.5 R
3,748,320  7/1973   Vorbruggen et al.......... 260/211.5 R

*Primary Examiner*—Johnnie R. Brown
*Attorney, Agent, or Firm*—Lyon & Lyon

[57] ABSTRACT s-Triazolo[2,3-a]pyrimidine nucleosides use in the inhibition of tubercle bacilli are disclosed which have the following general structure:

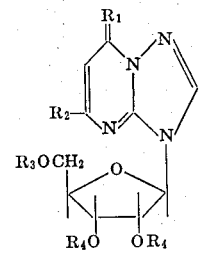

wherein $R_1$, $R_2$, $R_3$ and $R_4$ are as defined hereinafter. Also disclosed is a novel method for obtaining certain of the disclosed pyrimidine nucleosides by direct glycosylation of trimethylsilylated 5-chloro-s-triazolo[2,3-a]pyrimidin-7-one, trimethylsilylated 5-methyl-s-triazolo[2,3-a]pyrimidin-7-one or bis-trimethylsilylated 7-amino-s-triazolo[2,3-a]pyrimidin-5-one with a 2,3,5-tri-O-acetyl-D-ribofuranosylhalide. Furthermore, a new method of providing 7-imino-3-(2,3,5-tri-O-acetyl-β-D-ribofuranosyl)-s-triazolo[2,3-a]pyrimidine by the fusion of trimethylsilylated 7-amino-s-triazolo[2,3-a]pyrimidine with a 2,3,5-tri-O-acetyl-D-ribofuranosylhalide in the presence of a catalyst is disclosed.

17 Claims, No Drawings

S-TRIAZOLO[2,3-A] PRYIMIDINE NUCLEOSIDES

BACKGROUND OF THE INVENTION

In U.S. Pat. No. 3,689,488, various substituted s-triazolo[1,5-a]pyrimidines are described which are said to be useful in the prevention of bronchospasm in the treatment of diseases which involve spasm or construction of the bronchial musclature, as for example, asthma or bronchitis. Such derivatives are also reported to be useful in the treatment of obesity, due to sedative and anorexiant activity, and also to possess anti-allergic properties.

There has also been reported, a synthesis procedure for 3-and 4-($\beta$-D-ribofuranosyl)-s-triazolo[2,3-a]pyrimidin-7-one (although there was no reported activity for such compounds), *J. Hetero. Chem.* 8, 237, (1971), which appeared to be a feasible synthetic route to the obtainment of s-triazolo[2,3-a]pyrimidine derivatives, which might be useful in the treatment of a variety of disorders such as tuberculosis or other disease caused by bacterial infection, the treatment of bronchospasm, cardiovascular ailments, etc. We have accordingly synthesized the s-triazolo[2,3-a]pyrimidine nucleosides set forth hereinafter, including 5-chloro-3(2,3,5-tri-0-acetyl-$\beta$-D-ribofuranosyl)-s-triazolo[2,3-a]pyrimidin-7-one which has been found to be efficacious for the inhibition of *M. Tuberculosum*.

SUMMARY OF THE INVENTION

According to this invention, there are provided s-triazolo[2,3-a]pyrimidine nucleosides of the general structure:

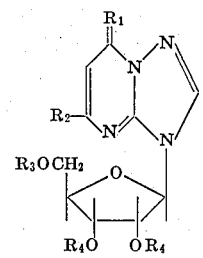

wherein $R_1$ may be O or NH; $R_2$ may be Cl, H, $NH_2$, $NHCH_3$, $N(CH_3)_2$, $NHNH_2$, $CH_3$, SH, or OH; $R_3$ may be H, acetyl, or $H_2PO_3$; and $R_4$ may be H or acetyl. The invention also provides a method for the direct glycosylation of 5,7-substituted-s-triazolo[2,3-a]pyrimidines. A method of obtaining 7-imino-3-(2,3,5-tri-0-acetyl-$\beta$-D-ribofuranosyl)-s-triazolo[2,3-a]pyrimidine by a direct fusion reaction is also provided.

DETAILED DESCRIPTION OF THE INVENTION

The general pathways utilized to produce the compounds of this invention are shown by the schematic drawings which follow. For convenience, the reactants and the products of the various reactions are indicated by numerals.

SCHEME I

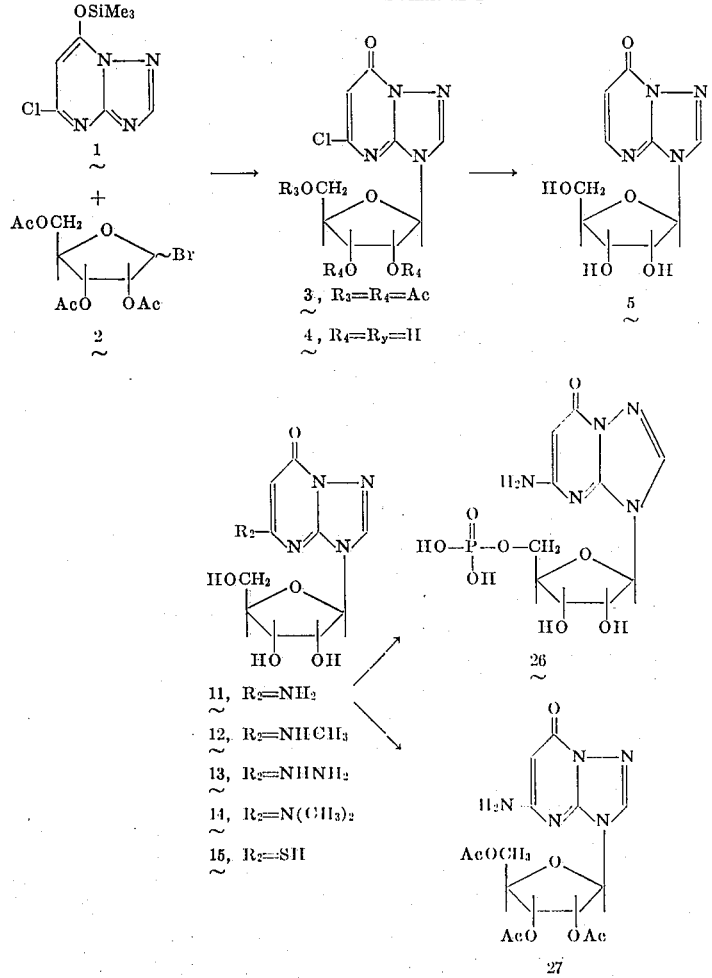

SCHEME II
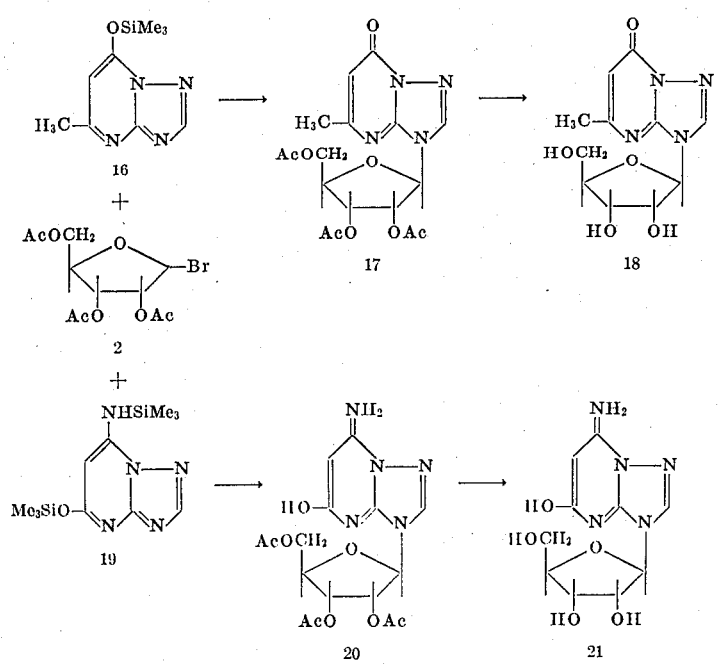
SCHEME III
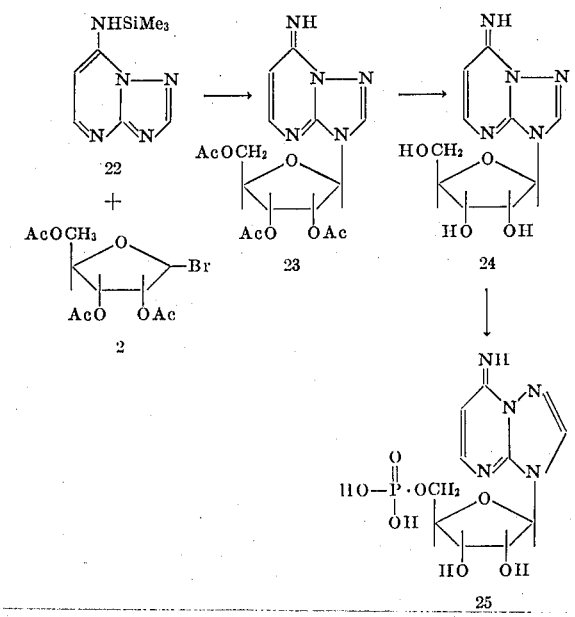
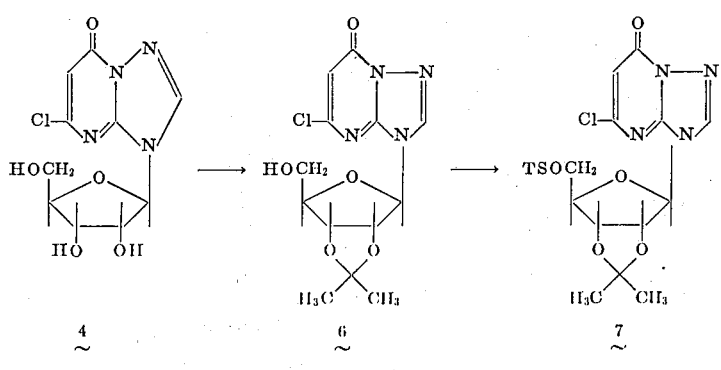

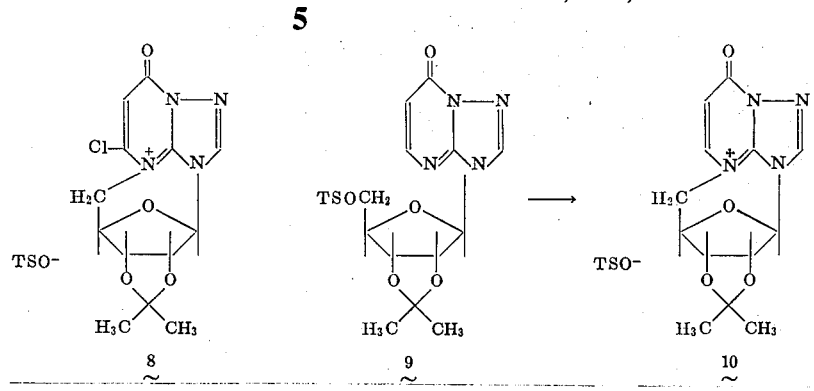

The silylation of 5-chloro-s-triazolo[2,3-a]pyrimidin-7-one with hexamethyldisilazane in the presence of ammonium sulfate, according to the general procedure of E. Wittenburg, Z. chem., 4, 303 (1964), furnished a quantitative yield of the crystalline trimethylsilyl derivative (Compound 1). Since Compound 1 is susceptible to hydrolysis, it is prepared immediately before utilization in the condensation reaction. Treatment of Compound 1 with 2,3,5-tri-0-acetyl-D-ribofuranosyl bromide (Compound 2) in dry acetonitrile at ambient temperature for about 48 hours provides a single homogeneous nucleoside, 5-chloro-3-(2,3,5-tri-0-acetyl-β-D-ribofuranosyl)-s-triazolo[2,3,a]pyrimidin-7-one (Compound 3) in 57 percent yield. The crystalline, blocked nucleoside (Compound 3) may be treated with methanolic ammonia at ambient temperature to furnish 5-chloro-3-β-D-ribofuranosyl-s-triazolo [2,3-a]pyrimidin-7-one (Compound 4) in excellent yield. That complete deacetylation occurs is evident by the absence of any absorption peaks at δ2.1 in the pmr spectrum of Compound 4.

That ribosylation of Compounds 3 and 4 occurred at $N_3$ was conclusively established by removing the 5-chloro group from Compound 4 by Pd/C-catalyzed hydrogenation at ambient temperature, thus demonstrating agreement of physicochemical data and chromatographic behavior of the resulting compound with those reported by M. W. Winkley et al., J. Hetero Chem. 8, 237, (1971) for 3-β-D-ribofuranosyl-s-triazolo[2,3-a]pyrimidin-7-one (Compound 5).

The anomeric configuration of Compound 3 and Compound 4 was established in the following manner by synthesising 5-chloro-3-(2,3-0-isopropylidene-β-D-ribofuranosyl)-s-triazolo [2,3-a]pyrimiden-7-one (Compound 6) from Compound 4 by standard procedure. Treatment of Compound 6 with p-toluenesulfonyl chloride in pyridine furnished a good yield of 5-chloro-3-(2,3-0-isopropylidene-5-0-p-toluenesulfonyl-β-D-ribofuranosyl)-s-triazolo[2,3-a]pyrimidin-7-one (Compound 7). Attempts to cyclize Compound 7 to the cyclonucleoside (Compound 8) by heating 7 in dimethylsulfoxide or acetonylacetone at 100° to 110°C for several hours were not successful. Hydrogenation of Compound 7 in the presence of palladium on carbon (10%) catalyst at ambient temperature, however, afforded 3-(2,3-0-isopropylidene-5-0-p-toluene-sulfonyl-β-D-ribofuranosyl)-s-triazolo[2,3-a]pyrimidin-7-one (Compound 9) and the cyclonucleoside (Compound 10) was formed by heating Compound 9 in dimethyl-sulfoxide at 100°C. This series of reactions established the anomeric configuration of Compound 4 and hence the nucleosides reported by Winkley et al in the previous investigation as β.

Nucleophilic substitution reactions proceed readily utilizing Compound 4 as the starting material to obtain several 5-substituted-3-β-D-ribofuranosyl-s-triazolo[2,3-a]pyrimidin-7-ones. Treatment of Compound 4 with methanolic ammonia at ambient temperature in a sealed vessel furnished a 64% yield of 5-amino-3-β-D-ribofuranosyl-s-triazolo[2,3-a]pyrimidin-7-one (Compound 11), the guanosine analog possessing a bridgehead nitrogen atom. A similar treatment of Compound 4 with methanolic monomethylamine or dimethylamine at ambient temperature produces 5-methylamino-3-β-D-ribofuranosyl-s-triazolo[2,3-a]pyrimidin-7-one (Compound 12) and 5-dimethylamino-3-β-D-ribofuranosyl-s-triazolo[2,3-a]pyrimidin-7-one (Compound 14), respectively. Likewise, 5-hydrazino-3-β-D-ribofuranosyl-s-triazolo[2,3-a]pyrimidin-7-one (Compound 13), may be obtained by the treatment of Compound 4, with methanolic hydrazine at ambient temperature.

Attempts to replace the 5-chloro group of Compound 4 with a mercapto group by treatment with thiourea in ethanol have not been successful. The glycosidic bond cleaves to furnish the heterocycle 5-chloro--triazolo[2,3-a]-pyrimidin-7-one. However, treatment of Compound 4 with methanolic hydrogen sulfide in the presence of ammonium carbonate afforded a 30% yield of 5-mercapto-3-β-D-ribofuranosyl-s-triazolo[2,3-a]pyrimidin-7-one (Compound 15).

Condensation of trimethylsilylated 5-methyl-s-triazolo [2,3-a]pyrimidin-7-one (Compound 16) with 2,3,5-tri-0-acetyl-D-ribofuranosyl bromide (Compound 2) in acetonitrile gave a 64% yield of crystalline 5-methyl-3-(2,3,5-tri-0-acetyl-β-D-ribofuranosyl)-s-triazolo[2,3-a]pyrimidin-7-one (Compound 17) which on deacetylation with methanolic ammonia at room temperature furnished 5-methyl-3-β-D-ribofuranosyl-s-triazolo[2,3-a]pyrimidin-7-one (Compound 18). Similar condensation of bis-trimethylsilylated 7-amino-s-triazolo[2,3-a]pyrimidin-5-one (Compound 19) with Compound 2 in acetonitrile gave a 77% yield of water-soluble 7-amino-3(4)-(2,3,5-tri-0-acetyl-β-D-ribofuranosyl)-s-triazolo[2,3-a]pyrimidin-5-one (Compound 20). Foamy Compound 20 was deacetylated with methanolic ammonia to afford 7-amino-3(4)-β-D-ribofuranosyl-s-triazolo[2,3-a]pyrimidin-5-one (Compound 21), the isoguanosine analog with a bridgehead nitrogen atom.

Trimethylsilylated 7-amino-s-triazolo[2,3-a]pyrimidine (Compound 22) was fused with Compound 2 in the presence of $AlCl_3$ at 100°C to obtain 7-imino-3-(2,3,5-tri-0-acetyl-β-D-ribofuranosyl)-s-triazolo[2,3-a]pyrimidine (Compound 23) which on deblocking with methanolic ammonia at ambient temperature provided 7-imino-3-β-D-ribofuranosyl-s-triazolo[2,3-a]pyrimidine (Compound 24), the adenosine analog. Phosphorylation of Compound 24 yielded 7-imino-3-β-D-ribofuranosyl-s-triazolo[2,3-a]pyrimiden-5'-phosphate (free acid) (Compound 25). Phosphorylation of Compound 11 and neutralization with a Ba(OH)$_2$ solution yielded 5-amino-3-β-D-ribofuranosyl-s-triazolo[2,3-a]pyrimidin-7-one-5'-phosphate barium salt (Compound 26). Compound 11 may also be reacetylated by the method of Tolman et al., *J. Med. Chem.*, 15, 883 (1972) to obtain 5-amino-3-(2,3,5-tri-0-acetyl-β-D-ribofuranosyl)-s-triazolo[2,3-a]pyrimidin-7-one (Compound 27).

This invention also provides a method of producing certain of the s-triazolo[2,3-a]pyrimidine nucleosides referred to above by glycosylation of trimethylsilylated 5,7-substituted-s-triazolo[2,3-a]pyrimidine with a 2,3,-5-tri-0-acyl-halopentafuranose, preferably 2,3,5-tri-0-acetyl-D-ribofuranosyl bromide, in the presence of a nonpolar aprotic solvent as, for example, benzene, tetrahydrofuran, trichloromethane, chloroform, dichloromethane, dioxane and acetonitrile which is the preferred solvent. The reaction will proceed in a temperature range of from about 10°C to about 75°C at which temperature the sugar begins to decompose, and preferably at ambient temperature in a period of from about 18 hours to about several weeks. Concentrations of the reactants are limited only by their solubilities in the solvent selected. However, the reaction is preferably carried out at equimular concentrations or at a slight excess of the heterocycle in order to avoid the difficulties associated with separating excess sugar from the product. The glycosylation reactions yielding compounds 3, 17 and 20 are specifically set forth in the examples.

The invention disclosed herein also provides a method for obtaining s-triazolo[2,3-a]pyrimidine nucleosides with an amino or substituted amino group on the heterocycle by direct glycosylation of the trimethylsilylated heterocycle with a 2,3,5-tri-0-acyl-halopentafuranose, preferably 2,3,5-tri-0-acetyl-D-ribofuranosyl bromide, in the presence of a catalyst. The catalyst may be any Lewis acid and is preferably a Friedel-Crafts catalyst as, for example, SnCl$_3$, ZnCl$_2$, and AlCl$_3$ which is the preferred catalyst. The reaction proceeds at a temperature of from about 50°C to about 150°C in about 5 minutes to about 2 hours, preferably about 10 minutes. The preferred concentration is an equal molar proportion of the reactants, although the reaction will proceed at any concentration with only the yield being detrimentally affected. Compound 23 may be obtained by this method by the fusion reaction of trimethylsilyated 7-amino-s-triazolo[2,3-a]pyrimidine with 2,3,5-tri-0-acetyl-D-ribofuranosyl bromide in the presence of AlCl$_3$. The reaction proceeds at about 100°C in about 10 minutes.

The invention is further described and illustrated by the following examples, in which all parts and percentages are by weight and all temperatures in degrees centigrade unless otherwise indicated. Melting points were determined with a Thomas-Hoover capillary melting point apparatus and are uncorrected. Elemental analysis were performed by M-H-W-Laboratores, Garden City, Mich. Evaporations were carried out under reduced pressure with bath temperature below 30°. Detection of components on SilicAR 7 GF was by ultraviolet light and by a 10% sulfuric acid in ethanol spray followed by heating. Chromatography solvent mixtures were by volume.

The Trimethylsilylated s-triazolo[2,3-a]pyrimidines were prepared using the general procedure of Wittenburg, *Z. Chem.*, 4, 303 (1964). The s-triazolo[2,3-a]pyrimidines [see, Y. Makisumi, *Chem. Pharm. Bull*, (Japan), 9, 801 (1961)] were heated under reflux in an excess of freshly distilled hexamethyldisilazane with a catalytic amount of ammonium sulfate under anhydrous conditions until complete solution was achieved and evolution of ammonia ceased (20–25 hrs.) The excess hexamethyldisilazane was removed by distillation under reduced pressure and the residue (oil or crystalline solid) was used directly without further purification.

EXAMPLE I

5-Chloro-3-(2,3,5,-tri-0-acetyl-β-D-ribofuranosyl)-s-triazolo [2,3,-a]pyrimidin-7-one (Compound 3)

To tetra-0-acetyl-D-ribofuranose (10.5 g) in dry dichloromethane (50 ml) at −20° was added a solution of dry dichloromethane (originally 50 ml) which had been saturated at −20° with dry hydrogen bromide gas. The mixture was protected from moisture and allowed to warm to 0°. The solution was evaporated to near dryness and the resulting syrup was co-evaporated twice with dry toluene (50 ml). The residual syrup was dissolved in dry "Nanograde" acetonitrile (100 ml) and was added to the trimethylsilyl derivative (prepared from 5.2 g of 5-chloro-s-triazolo[2,3-a]-pyrimidin-7-one by the method of E. Wittenburg, *Z, Chem.*, 4, 303 (1964)) in dry acetonitrile (50 ml). The reaction vessel was sealed and stirred at ambient temperature until solution occurred. After 48 hours the dark reaction mixture was filtered to remove some solid material (0.6 g) and the filtrate was evaporated to a syrup. Sodium bicarbonate (5.0 g), water (20 ml) and ethanol (50 ml) were added. The mixture was evaporated to dryness. Co-evaporation with absolute ethanol several times afforded dry residue which was extracted with chloroform (3 × 100 ml). The combined extracts were washed with cold saturated aqueous sodium bicarbonate solution (2 × 100 ml) followed by water (3 × 100 ml). The chloroform phase was dried over anhydrous sodium sulfate and then evaporated to dryness to a foam which was triturated with absolute ethanol (75 ml) at 0°. The solid that separated was collected, washed with a little ethanol and crystallized from aqueous ethanol with the aid of norit, yield 7.5 g (57%), mp 202°. A small sample was recrystallized from water-ethanol to obtain an analytically pure sample, mp 203°.

Anal. Calcd. for $C_{16}H_{17}N_4O_8Cl$: C, 44.81; H, 3.97; N, 13.07. Found: C, 44.80; H, 4.03; N, 12.90.

EXAMPLE II

5-Chloro-3-β-D-ribofuranosyl-s-triazolo[2,3-a]pyrimidin-7-one (Compound 4)

5-Chloro-3-(2,3,5-tri-0-acetyl-β-D-ribofuranosyl)-s-triazolo[2,3-a]-pyrimidin-7-one (Compound 3, 5.0 g) was dissolved in methanolic ammonia (100 ml, methanol saturated with ammonia at 0°). The container was sealed and left at room temperature overnight. The solution was filtered and the filtrate evaporated to dryness. The residue was triturated with anhydrous ether (4 × 75 ml) and the ether insoluble gum was dissolved in a minimum volume of ethanol. The solution was then applied to a silica gel column (3.5 × 50 cms. 70–230 mesh) prepacked in ethylacetate-water-isopropylalcohol (4:2:1, upper layer). The column was eluted with the same solvent system and each 15 ml fractions were collected. The fractionation was monitored by tlc on silica gel with ethylacetate-water-isopropylalcohol (4:2:1, upper layer) as the developer. The fractions 60–100 were pooled and the solvent evaporated. The residual syrup was triturated with ethanol (20 ml) and put aside for some time. The compound crystallized out as white needles, yield 3.0 g (85%), mp 168°–169°. Recrystallization from aqueous ethanol gave analytically pure crystals, mp 169°–170°.

Anal. calcd. for $C_{10}H_{11}N_4O_5Cl$: C, 39.68; H, 3.64; N, 18.51. Found: C, 39.67; H, 3.83; N, 18.53

EXAMPLE III

5-Amino-3--D-ribofuranosyl-s-triazolo[2,3-a]pyrimidin-7-one (Compound 11)

5-Chloro-3-β-D-ribofuranosyl-s-triazolo[2,3-a]pyrimidin-7-one (Compound 4, 1.0g) was dissolved in methanolic ammonia (50 ml, methanol saturated with ammonia at 0°) and the solution was allowed to stand at room temperature in a sealed steel reaction vessel (125 ml capacity) for 3 days. After cooling, the vessel was opened and the solution was evaporated to dryness. The residue was co-evaporated several times with methanol to a foam. The foam was triturated with anhydrous ether (150 ml), the white solid that separated was collected, washed thoroughly with anhydrous ether and dissolved in water (50 ml). The aqueous solution was freeze-dried to obtain white powder, yield 0.60 g (64%)

Anal. calcd for $C_{10}H_{13}N_5O_5$: C, 42.40; H, 4.63; N, 24.73. Found: C, 42.39; H, 4.53; N, 24.69.

EXAMPLE IV

5-Methylamino-3-β-D-ribofuranosyl-s-triazolo[2,3-a]pyrimidin-7-one (Compound 12)

5-Chloro-3-β-D-ribofuranosyl-s-triazolo[2,3-a]pyrimidin-7-one (Compound 4, 1.0 g) was dissolved in methanolic monomethylamine (50 ml, methanol saturated with anhydrous monomethylamine at 0°) and the solution was allowed to stand at room temperature in a stoppered pressure bottle. After 24 hours, the solution was filtered and the filtrate evaporated to dryness. The syrup was co-evaporated several times with absolute ethanol to remove last traces of monomethylamine. The residual foam was triturated with cold methanol and the solid that separated was collected and washed with methanol (2 × 5 ml). The product was crystallized from water-methanol as needles, yield 0.30 g (31%); mp 192° (dec.).

Anal. calcd. for $C_{11}H_{15}N_5O_5$: C, 44.44; H, 5.09; N, 23.56. Found: C, 44.33; H, 5.00; N, 23.46.

EXAMPLE V

5-Dimethylamino-3-β-D-ribofuranosyl-s-triazolo[2,3-a]pyrimidin-7-one (Compound 14)

5-Chloro-3-β-D-ribofuranosyl-s-triazolo[2,3-a]pyrimidin-7-one (Compound 4, 1.0 g) was dissolved in methanolic dimethylamine (50 ml, methanol saturated with anhydrous dimethylamine at 0°) and the solution was allowed to stand at room temperature in a stoppered pressure bottle. After 65 hrs. the crystalline needles that separated were collected and washed with a little methanol. The combined filtrate and washings were evaporated to dryness. The syrup was co-evaporated several times with absolute ethanol to remove last traces of dimethylamine. The crystalline residue was collected and washed with ethanol. The combined solid was recrystallized from water-methanol, yield 0.90 g (88%); mp 220°–221° (dec.).

Anal. calcd. for $C_{12}H_{17}N_5O_5$: C, 46.30; H, 5.50; N, 22.50. Found: C, 46.22; H, 5.31; N, 22.27.

EXAMPLE VI

5-Hydrazino-3-β-D-ribofuranosyl-s-triazolo[2,3-a]pyrimidin-7-one (Compound 13)

5-Chloro-3-β-D-ribofuranosyl-s-triazolo[2,3-a]pyrimidin-7-one (Compound 4, 1.0 g) was suspended in anhydrous methanol (30 ml) and hydrazine (10 ml, 95%) was added with stirring at room temperature. Immediately, a clear solution was obtained which began to turn pale brown. The mixture was refrigerated overnight and the solvent was evaporated. The residual syrup was co-evaporated several times with methanol and finally triturated with ethanol (25 ml). The solid that separated was collected, washed with cold ethanol (2 × 5 ml) and crystallized from water-ethanol, yield 0.65 g (66%); mp 225° (dec.)

Anal. calcd. for $C_{10}H_{14}N_6O_5$: C, 40.27; H, 4.73; N, 28.18. Found: C, 40.43; H, 4.84; N, 28.45.

EXAMPLE VII

5-Mercapto-3-β-D-ribofuranosyl-s-triazolo[2,3-a]pyrimidin-7-one (Compound 15)

Dry ammonium carbonate (1.2 g) in absolute methanol (10 ml) was saturated with anhydrous hydrogen sulfide gas at −5°. 5-Chloro-3-β-D-ribofuranosyl-s-triazolo[2,3-a]pyrimidin-7-one (Compound 4, 0.5 g) was added and the mixture was stirred at room temperature for 2 hrs. The exothermic reaction was accompanied by evolution of gas. Water (10 ml) containing ammonium hydroxide (1.0 ml) was added and the mixture heated at 60° for 30 minutes. The reaction mixture was cooled, filtered and the filtrate carefully neutralized with glacial acetic acid. The mixture was again filtered and the filtrate evaporated to dryness. The residue was collected, washed with ethanol (3 × 5 ml) and crystallized from water-ethanol with the aid of norit, yield 0.15 g (30%), mp 218° (dec.).

Anal. Calcd. for $C_{10}H_{12}N_4O_5S$: C, 40.00; H, 4.03; N, 18.66. Found: C, 39.86; H, 3.77; N, 18.84.

EXAMPLE VIII

5-Methyl-3-(2,3,5,-tri-0-acetyl-β-D-ribofuranosyl)-s-triazolo [2,3-a]pyrimidin-7-one (Compound 17)

A solution of 2,3,5,-tri-0-acetyl-D-ribofuranosyl bromide from 5.5 g of tetra-0-acetyl-β-D-ribofuranose in dry acetonitrile (80 ml) was added to the trimethylsilyl derivative of 5-methyl-s-triazolo[2,3-a]pyrimidin-7-one (Compound 16, prepared from 2.30 g of 5-methyl-7-hydroxy-s-triazolo[2,3-a]pyrimidin according to the method of K. Shirakaw, *Yakugaku Zasshi*, 78, 1395 (1958)) and the resulting solution was stirred at room temperature for 45 hrs. in a sealed reaction vessel. After 5 hrs. some solid had begun to form and upon termination of the reaction, the mixture was nearly solid. The solid was collected and washed with a little acetonitrile. The combined filtrate and washings were evaporated to dryness. The residual foam was triturated with cold ethanol (25 ml). The solid that separated was collected and the combined solid was crystallized from water-ethanol to provide pure material, yield 4.0 g (64%); mp 224°.

Anal. Calcd. for $C_{17}H_{20}N_4O_8$: C, 50.00; H, 4.94; N, 13.72. Found: C, 50.09; H, 4.92; N, 13.80.

EXAMPLE IX

5-Methyl-3-β-D-ribofuranosyl-s-triazolo[2,3-a]pyrimidin-7-one (Compound 18)

5-Methyl-3-(2,3,5-tri-0-acetyl-β-D-ribofuranosyl)-s-triazolo[2,3-a]-pyrimidin-7-one (Compound 17, 3.0 g) was dissolved in methanolic ammonia (60 ml. methanol presaturated with ammonia at 0°). The container was sealed and left at room temperature overnight. The solution was filtered and the filtrate evaporated to dryness. The residue was collected, washed thoroughly with cold ethanol and crystallized from ethanol containing a few drops of water, yield 1.9 g (92%); mp 240° (dec.).

Anal. calcd. for $C_{11}H_{14}N_4O_5$: C, 46.81; H, 5.00; N, 19.85. Found: C, 46.88; H, 4.85; N, 19.88.

EXAMPLE X

7-Amino-3(4)-β-D-ribofuranosyl-s-triazolo[2,3-a]pyrimidin-5-one (Compound 21, Isoguanosine analog)

To the bis-trimethylsilyl derivative (Compound 19, prepared from 4.53 g of 7-amino-s-triazolo[2,3-a]pyrimidin-5-one according to the method of E. W. Henburg, Z. Chem., 4, 303 (1964)) was added 2,3,5,-tri-0-acetyl-D-ribofuranosyl bromide (prepared from 10.5 g of tetra-0-acetyl-β-D-ribofuranose) in dry acetonitrile (100 ml). The reaction vessel was sealed and stirred at ambient temperature for 75 hrs. The clear brown solution was evaporated to a syrup. Sodium bicarbonate (5.0 g), water (20 ml) and ethanol (50 ml) were added. The mixture was evaporated to dryness. Coevaporation with absolute ethanol several times afforded a dry residue which was extracted with chloroform (3 × 100 ml) and dried over anhydrous sodium sulfate. The chloroform solution was decolorized with norit and evaporated to yield a foam which is highly soluble in water. The foam was dissolved in a minimum volume of water and applied to a silica gel column (5 × 75 cms, 70–230 mesh) prepacked in ethyl acetate-water-isopropylalcohol (4:2:1, upper layer). The column was eluted with the same solvent system and each 30 ml fractions were collected. The fractionation was monitored by tlc on silica gel with ethylacetate-water-isopropylalcohol (4:2:1, upper layer) as the developer. The fractions 120–160 were pooled and the solvent evaporated to yield cream colored foam (Compound 20), 9.50 g (77%).

The above foamy 7-amino-3(4)-(2,3,5-tri-0-acetyl-β-D-ribofuranosyl)-s-triazolo[2,3-a]pyrimidin-5-one (Compound 20 8.0 g) was dissolved in methanolic ammonia (200 ml, methanol presaturated with ammonia at 0°) and the solution was allowed to stand at room temperature overnight. The solution was filtered and the filtrate evaporated to dryness. The residue was triturated with absolute ethanol and filtered. The solid material was dissolved in minimum volume of water and chromatographed on a silica gel column (3.5 × 50 cms, 70–230 mesh) eluting with isopropylalcohol-ammonium hydroxide-water (7:1:2) and the appropriate fractions were pooled and the solvent evaporated. The residual foam was dissolved in water and freeze-dried, yield 3.50 g (63%). The compound is hygroscopic.

Anal. Calcd. for $C_{10}H_{13}N_5O_5$: C, 42.40; H, 4.63; N, 24.73. Found: C, 42.22; H, 4.41; N, 24.92.

EXAMPLE XI

7-Imino-3-β-D-ribofuranosyl-s-triazolo[2,3-a]pyrimidine (Compound 24)

To the syrupy trimethylsilyl derivative of 7-amino-s-triazolo[2,3-a] pyrimidine (prepared from 5.4 g of the base according to the method of Y. Makisumi, et al., Chem. Pharm. Bull. (Japan), 7, 907[1959]) was added 2,3,5-tri-0-acetyl-D-ribofuranosyl bromide (prepared from 14.0 g of tetra-0-acetyl-β-D-ribofuranose) and a catalytic amount of $AlCl_3$ (about 50 mg). The mixture was thoroughly mixed and heated at 100° (oil bath temperature) for 10 min. in vacuum (oil pump) with good stirring. Within 2-3 minutes the mixture began to solidify, accompanied by frothing. The reaction mixture was cooled; $AlCl_3$ decomposed by adding cold water and extracted with chloroform (250 ml). The chloroform solution was washed with aqueous sodium bicarbonate solution (2 × 100 ml) followed by water (3 × 75 ml) and then dried over anhydrous sodium sulfate. The chloroform solution was evaporated to dryness, the residual foam (12.0 g) was dissolved in a minimum volume of benzene — ethyl acetate (1:1) and applied to a silica gel column (4.5 × 50 cms, 70–230 mesh) prepacked in benzene — ethyl acetate (1:1). The column was eluted with benzene-ethyl acetate-ethanol (5:5:1) and 20 ml fractions were collected. The fractionation was monitored by tlc on silica gel with benzene-ethyl acetate-ethanol (5:5:1) as the developer. The fractions 56–120, indicating homogeneous nucleoside material, were pooled and the solvent evaporated, which afforded 4.0 g of cream colored foamy 7-imino-3-(2,3,5-tri-0-acetyl-β-D-ribofuranosyl)-s-triazolo[2,3-a]pyrimidine (Compound 23).

Above blocked nucleoside (4.0 g) was dissolved in methanolic ammonia (100 ml, methanol presatured with ammonia at 0°) and the solution was allowed to stand at room temperature overnight. The solution was filtered and the filtrate evaporated to dryness. The solid that separated was collected, washed with cold methanol (2 × 10 ml) and crystallized from ethanol as needles, yield 2.0 g (19%), mp 177° (dec.).

Anal. Calcd. for $C_{10}H_{13}N_5O_4$: C, 44.94; H, 4.90; N, 26.21. Found: C, 44.78; H, 5.00; N, 26.33.

EXAMPLE XII

7-Imino-3-β-D-ribofuranosyl-s-triazolo[2,3-a]pyrimidine-5′-phosphate (free acid) (Compound 25)

7-Imino-3-β-D-ribofuranosyl-s-triazolo[2,3-a]pyrimidine (Compound 24) was added with stirring to a precooled (~50, ice bath) mixture of 10 ml trimethyl phosphate and 1.2 g phosphorus oxychloride. After all the solid had dissolved (~7 min) it was stored at 0° for 4 hrs. Tlc (solvent L) indicated the reaction to be complete and it was poured slowly into ice water containing 2.6 g $NaHCO_3$. The ice water soln was allowed to stand for 1 hr to stabilize the pH at 6. The soln was extracted with ether (3 × 75 ml) to remove the trimethyl phosphate. The volume of the aqueous phase was reduced in vacuo until crystals (salt) began to form. Enough water was added to dissolve the crystals and the soln was applied to the top of a Dowex 1 × 2

(formate form, 400 ml) column. The column was washed with water to remove salts and the product was eluted with a formic acid gradient (0-.5M, 1 liter ea). The product came off after 400 ml of elutant; the uv-absorbing fractions were evaporated to 50 ml in vacuo and lyophilized to yield a fluffy white solid m.p. 125°.

Anal. Calcd $C_{10}H_{14}N_5O_7P$: C, 34.59; H, 4.06; N, 20.16 Found: C, 34.24; H, 4.43; N, 19.96

EXAMPLE XIII

5-Amino-3-β-D-ribofuranosyl-s-triazolo[2,3-a]pyrimidin-7-one-5'-phosphate barium salt (Compound 26)

5-Amino-3-β-D-ribofuranosyl-s-triazolo[2,3-a]pyrimidin-7-one (Compound 11 1.0 g) was added with stirring to a precooled (0°-5°) mixture of phosphorus oxychloride (1.2 g) and trimethyl phosphate (10 ml). As soon as solution was achieved, the mixture was stored at 0° for 4 hrs. Tlc (solvent L2, silica gel) indicated the completion of the reaction. The mixture was poured into ice water containing 2.5 g of sodium bicarbonate and allowed to stand for an hour to stabilize the pH at 6. Trimethyl phosphate was removed by extraction with ether (3 × 50 ml). The aqueous solution was concentrated in vacuo until salts began to crystallize. Enough water was added to achieve solution and the pH was checked (6–6.5) before placing the solution on top of a Dowex 1 × 2 (formate form, 75 ml) column. The column was washed with water until there was no uv absorbing material present. Gradient elution (0– 2 M formic acid) gave the product as a thick band. The solvent was evaporated in vacuo and the residual syrup was dissolved in water (25 ml), carefully neutralized with aqueous saturated $Ba(OH)_2 \cdot 8H_2O$ solution. The precipitated Ba-salt was collected and washed thoroughly with water. The Ba-salt was treated with Dowex-50H$^+$ ion exchange resin to regenerate the free acid. Attempts to isolate the acid in solid form failed. The syrupy 5-Amino-3-β-D-ribofuranosyl-s-triazolo[2,3-a]pyrimidin-7-one-5'-phosphate was dissolved in water (25 ml) and carefully neutralized with aqueous $Ba(OH)_2$ solution. The Ba-salt that separated was collected, washed with cold water (20 ml × 5) and dried (80°, under vacuum) to constant weight.

5-Chloro-3-(2,3,5-tri-0-acetyl-β-D-ribofuranosyl)-s-triazolo[2,3-a]pyrimidin-7-one has been tested in vitro for the inhibition of the bacteria *M. Tuberculosum* and found to be an effective inhibitor at a dose of 25 μg/me. In view of such discovered activity, it may be expected that other of the s-triazolo[2,3-a]pyrimidine nucleosides herein disclose likewise are efficacious in the inhibition of tubercle bacilli or other mycobacteria. Further, in view of the aforenoted report of the usefulness of s-triazolo[2,3-a]pyrimidines in the prevention of bronchospasm and in the treatment of diseases which involve spasm of constriction of the bronchial musculature, it may be expected that the s-triazolo[2,3-a]pyrimidine nucleosides set forth herein will also demonstrate similar efficacy.

We claim:

1. A compound of the structure:

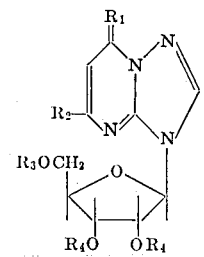

wherein $R_1$ is O or NH; $R_2$ is Cl, H, $NH_2$, $NHCH_3$, $N(CH_3)2$, $NHNH_2$, $CH_3$, SH, or OH; $R_3$ is H, acetyl, or $H_2PO_3$; and $R_4$ is H or acetyl.

2. The compound of claim 1 in which $R_1$ is O, $R_2$ is Cl and $R_3$ and $R_4$ are acetyl.

3. The compound of claim 2 in which $R_3$ and $R_4$ are H.

4. The compound of claim 1 in which $R_1$ is O, $R_2$ is $NH_2$, and $R_3$ and $R_4$ are H.

5. The compound of claim 4 in which $R_3$ and $R_4$ are acetyl.

6. The compound of claim 4 in which $R_3$ is phosphate.

7. The compound of claim 4 in which $R_2$ is $NHCH_3$.

8. The compound of claim 4 in which $R_2$ is $NHNH_2$.

9. The compound of claim 4 in which $R_2$ is $N(CH_3)_2$.

10. The compound of claim 4 in which $R_2$ is SH.

11. The compound of claim 1 in which $R_1$ is O, $R_2$ is $CH_3$, and $R_3$ and $R_4$ are acetyl.

12. The compound of claim 11 in which $R_3$ and $R_4$ are H.

13. The compound of claim 1 in which $R_1$ is NH, $R_2$ is OH, and $R_3$ and $R_4$ are acetyl.

14. The compound of claim 13 in which $R_3$ and $R_4$ are H.

15. The compound of claim 1 in which $R_1$ is NH, $R_2$ is H, and $R_3$ and $R_4$ are acetyl.

16. The compound of claim 15 in which $R_3$ and $R_4$ are H.

17. The compound of claim 16 in which $R_3$ is phosphate.

* * * * *